No. 693,698. Patented Feb. 18, 1902.
J. & F. FURRER.
HARROW.
(Application filed Nov. 12, 1901.)
(No Model.) 2 Sheets—Sheet 1.
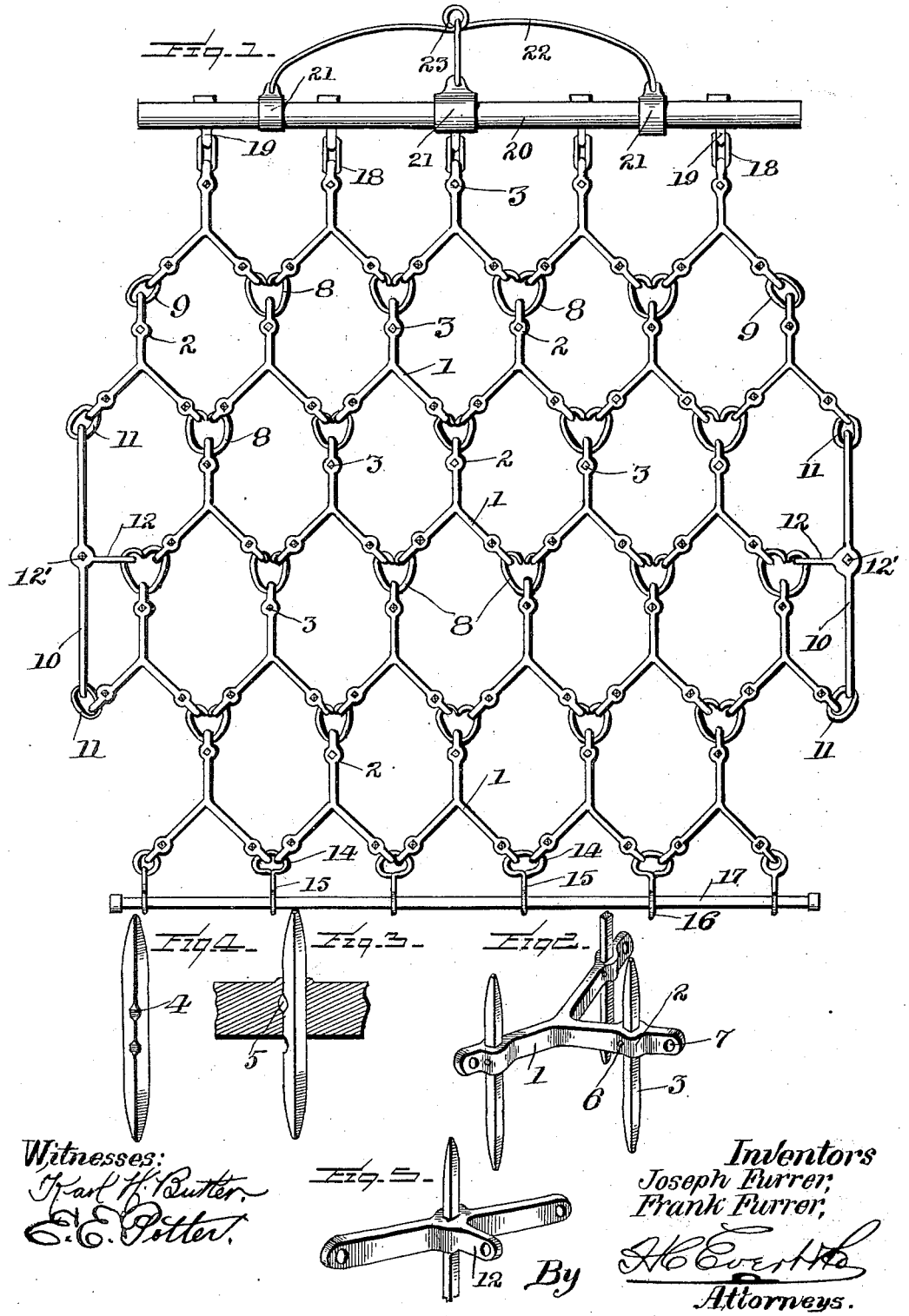
Witnesses:
Karl H. Butter
E. E. Potter
Inventors
Joseph Furrer,
Frank Furrer,
By H. C. Everth
Attorneys.

No. 693,698. Patented Feb. 18, 1902.
J. & F. FURRER.
HARROW.
(Application filed Nov. 12, 1901.)
(No Model.) 2 Sheets—Sheet 2.
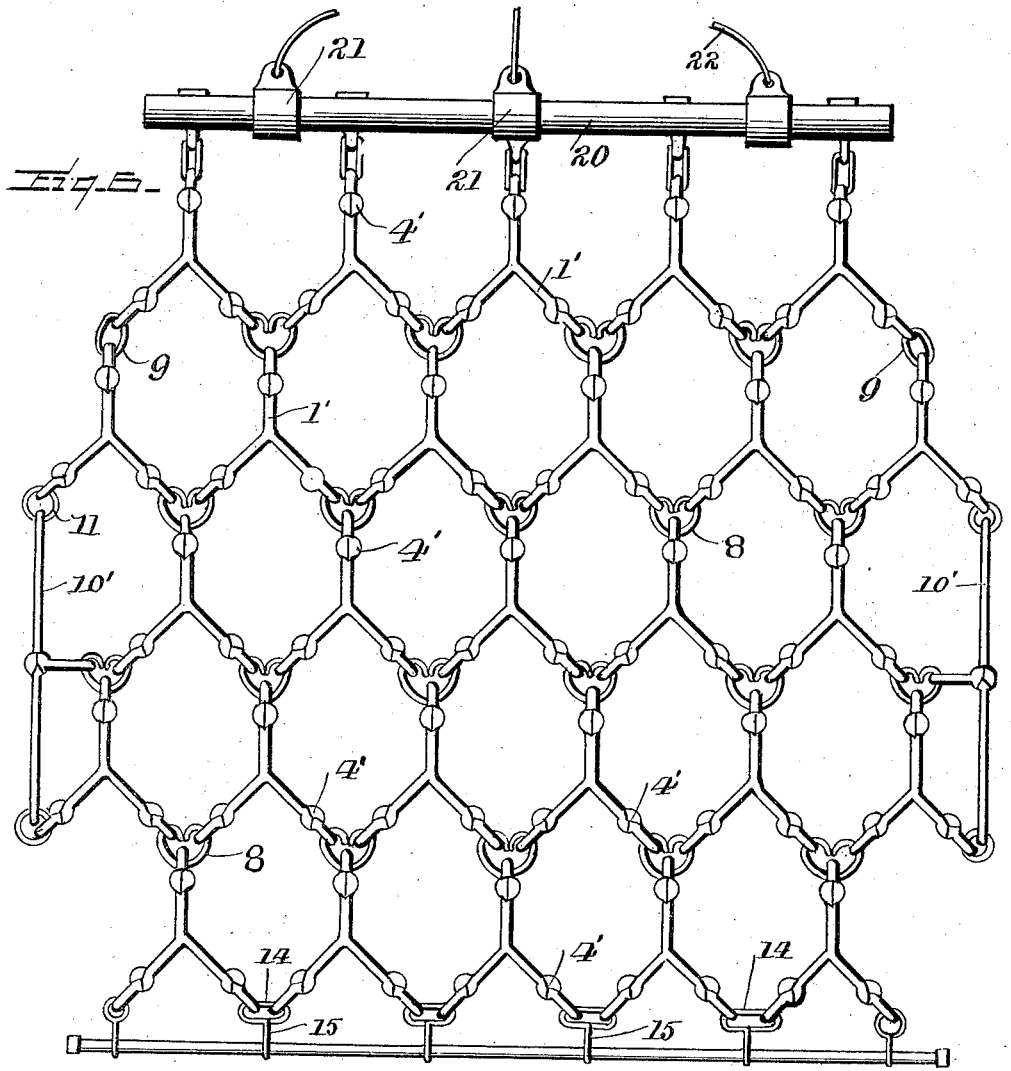
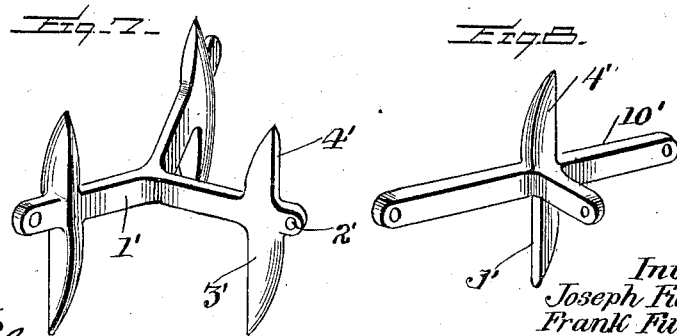
Witnesses:
Inventors.
Joseph Furrer,
Frank Furrer,
By
Attorneys.

UNITED STATES PATENT OFFICE.

JOSEPH FURRER AND FRANK FURRER, OF ALLEGHENY, PENNSYLVANIA.

HARROW.

SPECIFICATION forming part of Letters Patent No. 693,698, dated February 18, 1902.

Application filed November 12, 1901. Serial No. 81,982. (No model.)

*To all whom it may concern:*

Be it known that we, JOSEPH FURRER and FRANK FURRER, citizens of the United States of America, residing at Allegheny, in the county of Allegheny and State of Pennsylvania, have invented certain new and useful Improvements in Harrows, of which the following is a specification, reference being had therein to the accompanying drawings.

This invention relates to certain new and useful improvements in harrows, and relates more specifically to that class known as "chain-harrows."

The invention has for its main object to construct a harrow which is flexible in order that the same may readily adapt itself to uneven surfaces; and the invention further aims to so construct the harrow that the same may be inverted, so as to be adapted for either deep or shallow harrowing of the ground, as may be desired.

Briefly described, the invention comprises a series of spider-like sections, each comprising three arms radiating from a common center, each of these arms carrying a tooth and the sections being linked together in such a manner that two teeth of the section are staggered with respect to the other tooth of each section. By this arrangement it is possible to apply the draft centrally to the front end of the harrow instead of at one corner thereof, as is the usual practice in drag-harrows.

The invention finally consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a top plan view of our improved harrow. Fig. 2 is a detail perspective view of one of the sections which when linked together constitute the harrow. Fig. 3 is a longitudinal sectional view of a part of one of the sections, showing the tooth in perspective. Fig. 4 is a detail perspective view of one of the removable teeth. Fig. 5 is a detail perspective view of one of the side coupling-links, the tooth carried thereby being partially broken away. Fig. 6 is a top plan view of a modified form of construction. Fig. 7 is a detail perspective view of one of the sections which constitute the harrow in this modified form. Fig. 8 is a like view of one of the side coupling-links.

Our improved harrow comprises a series of spider-like sections, each comprising three arms 1, radiating from a common center and each arm having enlargements or bosses 2, which are apertured to receive the teeth 3. These teeth 3 in the form of harrow shown in Figs. 1 to 5, inclusive, are made substantially square in cross-section and pointed at both ends, each tooth being provided in one of its edges with one or more notches 4, one of which notches is brought into registration with the notch 5, made in the arms 1, these notches 4 and 5 when in registration receiving the cotter-pin 6 for securing the teeth in the arms. These cotter-pins are preferably made of copper or other material which will not rust. Each arm is provided near its free end with an eye 7, and the spider-like sections are staggered with respect to each other, so that one of the arms 1 will project toward the forward end of the harrow and the other two arms will project rearwardly at an angle. The adjacent angularly-projecting arms 1 of the sections are connected together by a link 8, which may be made substantially heart-shaped, as shown, so as to connect the adjacent rearwardly-extending arms of one row of the sections to the forwardly-extending arm of the next row of the sections. The harrow may be made of any desired number of rows of these sections, though we preferably employ five rows of sections, and the outside arm of the first row is connected to the outside or front arm of the second row by means of the ordinary split links 9. The outside arm of the second row of sections is connected to the outside arm of the fourth row of the sections by means of the link-bar 10, having eyes in its ends to receive the split rings 11, this link-bar having a tooth 12' and carrying a short shank 12, having an eye to receive the adjacent link 8. The teeth are locked in the arms by means of cotter-pins and made adjustable by providing one or more of the notches 4 in the teeth and these teeth set in the arms so that a greater portion thereof will project to one side of the section than to the other. The rearwardly-extending arms of the last row of the sections receive links 14, which connect them together and carry a shank 15, having an eyebolt 16 to receive the drag-bar 17, the latter being preferably formed of a heavy piece of tubular pipe or other cylindrical device. The forward arms of the front row of the sections receive links 18, which are connected to bolts 19, that extend through the connecting-bar 20. This connecting-bar carries clamps 21, to which is connected a rod 22, and is provided centrally with an eye 23, adapted to receive the clevis of the double draft. (Not shown.)

In the form of construction shown in Figs. 6 to 8, inclusive, the sections which comprise the harrow have the teeth cast integral therewith. These sections, like those of the preferred form of construction, comprise three arms 1', provided near their outer ends with an eye 2'. Each of these arms carries integral teeth, the portion 3' thereof that projects from one side of the sections being of greater length than the sections 4', that project from the opposite side of the sections. The forward or engaging edge of the sections 3' is made rounded, while the forward or projecting edge of the sections 4' is made flat. This is done for the reason that the sections 3' are used for deep harrowing, while when the harrow is inverted, so as to bring the sections 4' underneath, the flat faces thereof will be at the front, and these teeth are particularly adapted for seeding, the flat faces forming a furrow into which the seed will readily fall. These sections are staggered in the same manner as the sections in the preferred form of construction and are connected together by the same form of links. The link-bar coupling 10' at the sides of the harrow has the same form of teeth as the spider-like sections and is linked to the sections in the same manner as afore described. The same form of connecting device is employed at the front of the harrow and a like drag-bar at the rear of the harrow. By reason of the harrow comprising a series of independent sections, each of which is moved independently of the other sections, owing to the link connections between the sections, it will be observed that sufficient flexibility is obtained to permit the harrow to adapt itself to any uneven surfaces in the ground being worked.

In the practice of the invention it will be noted that various changes may be made in the details of construction without departing from the general spirit of our invention.

Having fully described our invention, what we claim as new, and desire to secure by Letters Patent, is—

A harrow comprising a series of rows of spider-like sections, each section having three arms with a tooth carried in each of said arms, the ends of said arms having links connected to each other, the outside lower arms of the first row being connected to the outside upper arms of the second row, a link-bar having eyes at its ends, said link-bar having one of said eyes connected to the lower outside arms of said second row and its other end connected to the lower outside arms of the fourth row, a short inwardly-extending shank carried by said link-bar and secured to the outside lower arm of the third row and to the upper arm of the fourth row, a tooth carried by the link-bar adjacent to the shank, the lower arms of the last row having links secured thereto, said links carrying eyebolts, and a drag-bar secured in said eyebolts, substantially as described.

In testimony whereof we affix our signatures in the presence of two witnesses.

JOSEPH FURRER.
FRANK FURRER.

Witnesses:
JOHN NOLAND,
E. E. POTTER.